United States Patent

Hutto et al.

[11] Patent Number: 5,481,800
[45] Date of Patent: Jan. 9, 1996

[54] METHOD OF MAKING A PARALLEL FLOW CONDENSER WITH LAP JOINED HEADERS

[75] Inventors: Scott L. Hutto; John M. McCrady, both of Burleson; John T. Bertva, Colleyville, all of Tex.

[73] Assignee: Wynn's Climate Systems, Inc., Fort Worth, Tex.

[21] Appl. No.: 157,674

[22] Filed: Nov. 24, 1993

[51] Int. Cl.⁶ .................................................. B23P 15/26
[52] U.S. Cl. .................. 29/890.043; 29/890.052; 29/890.054
[58] Field of Search .................. 29/890.043, 890.052, 29/890.054, 428; 165/173

[56] References Cited

U.S. PATENT DOCUMENTS

| | | | |
|---|---|---|---|
| 4,936,381 | 6/1990 | Alley | 165/176 |
| 4,945,635 | 8/1990 | Nobusue et al. | 165/173 |
| 5,082,051 | 1/1992 | Ando | 165/153 |
| 5,119,552 | 6/1992 | Sutou et al. | 29/890.052 |
| 5,172,762 | 12/1992 | Shinmura et al. | 165/173 |
| 5,214,847 | 6/1993 | Aoki | 29/890.043 |
| 5,259,449 | 11/1993 | Case | 29/890.043 |

*Primary Examiner*—Irene Cuda
*Attorney, Agent, or Firm*—James E. Bradley; Mark W. Handley

[57] ABSTRACT

A parallel flow condenser is provided for use in an automotive air conditioner. The parallel flow condenser has tubular headers formed by taking a metal sheet, cutting slots therein for receiving parallel flow tubes, rolling the metal sheet to form the tubular header with opposing edges which are lap joined, and cutting slots into the header for receiving the baffles. The condenser is then assembled and placed within a brazing furnace to sealingly secure the condenser assembly together.

20 Claims, 2 Drawing Sheets

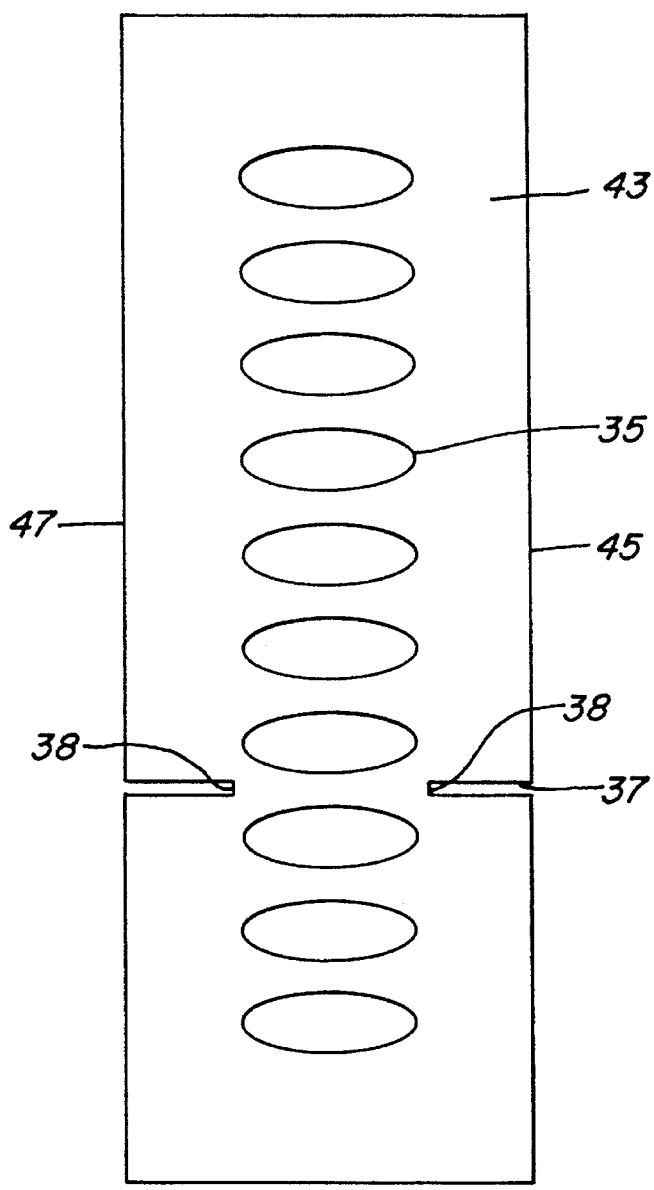
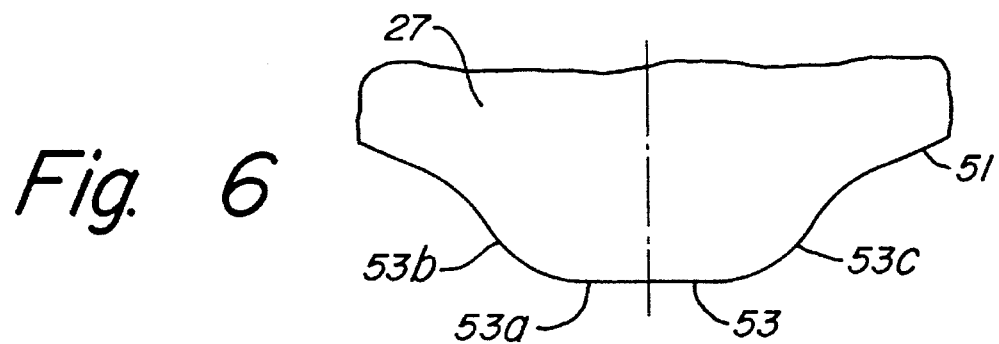
Fig. 4
Fig. 6

1

METHOD OF MAKING A PARALLEL FLOW CONDENSER WITH LAP JOINED HEADERS

BACKGROUND OF THE INVENTION

1. Field of the Invention

This invention relates in general to condensers used in air conditioners for motor vehicles, and in particular, to a type of condenser having flat, parallel flow tubes extending between headers. The headers are formed by rolling a sheet of metal to lap join opposite edges, and into which baffles are installed for diverting refrigerant to flow from within the headers and through particular ones of the flat, parallel flow tubes.

2. Description of the Prior Art

Parallel flow condensers are becoming more commonly used with air conditioning systems of motor vehicles. In a parallel flow condenser, two headers are spaced apart from each other, one of the headers having an inlet for passing refrigerant vapor, and the other header having an outlet for passing refrigerant condensate. Flat parallel tubes extend between the headers. One or more baffles, or partitions, locate in the headers for directing refrigerant flow through the parallel tubes between the headers. Fins are positioned between the parallel flow tubes to enhance heat transfer as air moves across the parallel flow tubes.

Prior art parallel flow condensers have headers that are formed from tubes which have slots cut therein for receiving flow tubes and baffle plates. Some of these prior art headers have been made from seamless tubular pipe. Other prior art headers for parallel flow condensers have been made by forming a header from a metal sheet by rolling the metal sheet to butt join opposing edges, and inserting flow tubes and baffle plates into holes cut through the flat plate prior to forming.

Since these prior art headers for parallel flow condensers are formed from either seamless tube, or butt joined metal sheet, they must have a large enough wall thickness to maintain structural integrity during the service life of the parallel flow condensers. Prior art headers for parallel flow condensers formed from butt joined metal sheet must be precisely formed so that opposing edges of metal sheet meet to form a butt joint.

Improvements are desired.

SUMMARY OF THE INVENTION

A parallel flow condenser is provided for use in an automotive air conditioner. The parallel flow condenser has tubular headers between which parallel flow tubes extend for passing a refrigerant fluid therebetween. The headers are formed by taking a metal sheet, cutting slots therein for receiving the parallel flow tubes, rolling the metal sheet to form a header with opposing edges which are lap joined, and cutting slots into the header for receiving the baffles. The parallel flow tubes, baffle plates, and end caps are inserted within the headers, and the entire assembly is placed within a brazing furnace.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a development view depicting the flat pattern of one of the headers of FIG. 1 which are formed from a flat aluminum alloy brazing sheet.

FIG. 6 is an enlarged partial view of the baffle plate of FIG. 5, depicting the end tip periphery.

DETAILED DESCRIPTION OF THE PREFERRED EMBODIMENT

Figure 1:
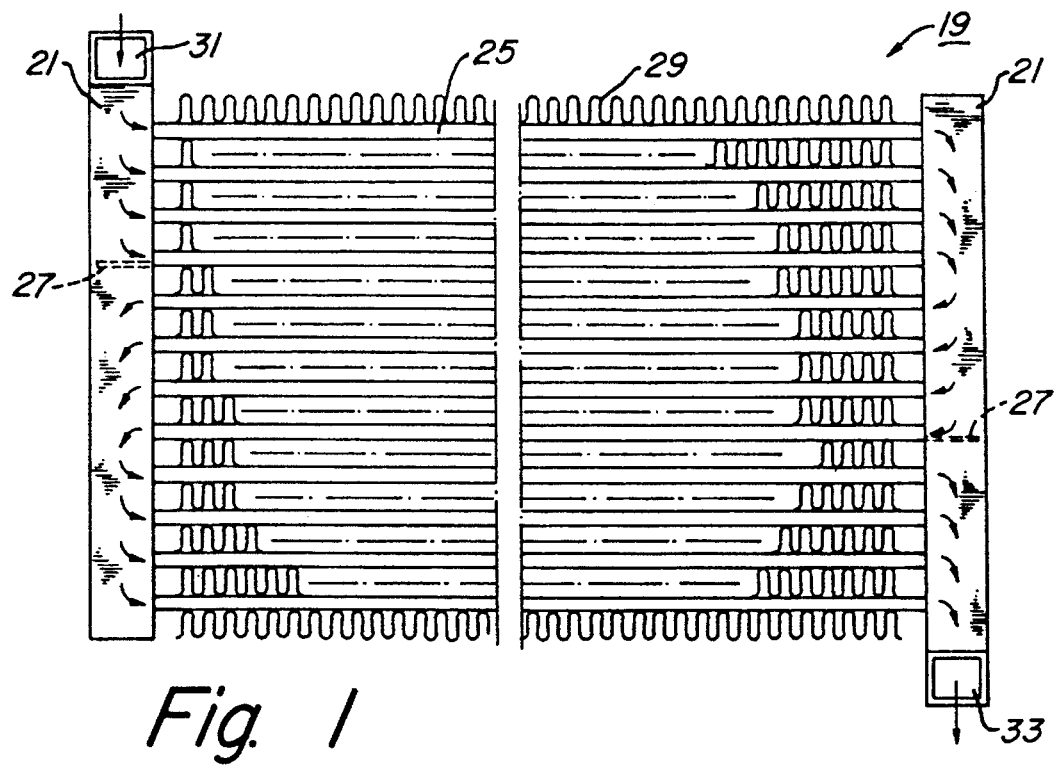
FIG. 1 is a schematic side view of a condenser constructed in accordance with the invention.

Referring to FIG. 1, a schematic side view depicts condenser 19, the preferred embodiment of the present invention. Condenser 19 has a pair of spaced apart headers 21. Headers 21 are tubular members. In the preferred embodiment of the present invention, headers 21 are cylindrical members which extend in parallel. Flow tubes 25 extend in a parallel arrangement between headers 21 for passing a refrigerant fluid therebetween. Baffles plates 27 are within headers 21 for diverting flow into flow tubes 25. Fins 29 are disposed between flow tubes 25 for enhancing heat transfer between flow tubes 25 and ambient air. Condenser 19 further has inlet 31 for passing the refrigerant fluid in a vapor phase, and outlet 33 for passing the refrigerant fluid in a condensate, or liquid phase.

Figure 2:
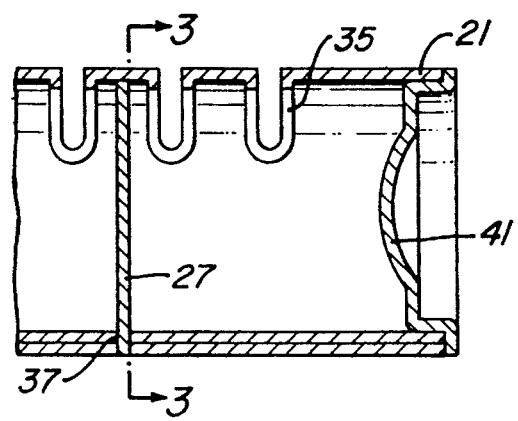
FIG. 2 is an enlarged, partial, vertical sectional view of one of the headers of the condenser of FIG. 1, showing a baffle plate and end cap.

Referring to FIG. 2, an enlarged, partial, vertical sectional view depicts one of headers 21 of condenser 19. Each of headers 21 includes slots 35 which are first apertures for receiving flow tubes 25 (shown in FIG. 1). At least one of headers 21 includes at least one slot 37 which is a second aperture for receiving baffle plate 27. End caps 41, one of which is shown in FIG. 2, seal the longitudinal ends of headers 21.

Figure 3:
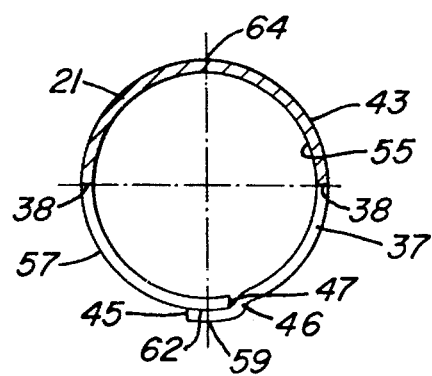
FIG. 3 is a sectional view of one of the headers with a baffle plate removed, taken along section line 3—3 of FIG. 2.

Referring to FIG. 3, a sectional view depicts one of headers 21, with a baffle plate removed, taken along section line 3—3 of FIG. 2. Each of headers 21 are tubular members having a cylindrical cross-section. Headers 21 are formed by rolling a flat sheet to overlap two opposing edges 45 and 47 so that they contact one another. Overlapped edge 47 locates within an interior side portion of adjacent edge 45. A bend, or joggle 46 is formed near edge 45 to provide a constant internal diameter and thus a smooth internal circumference for headers 21. Slot 37 has a circumferential extent of approximately 180 degrees, with slot ends 38 being 180 degrees apart from each other. Slot 37 is axially spaced along tubular header 21 between two of slots 35, as shown in FIG. 2.

Referring to FIG. 4, a development view depicts a flat pattern of one of headers 21 of FIG. 1 which is formed from metal sheet 43. Apertures 35 and 37 are for receiving flow tubes and a baffle plate. Metal sheet 43 is, in the preferred embodiment of the present invention, a flat, aluminum alloy brazing sheet from which one of headers 21 is formed. Metal sheet 43 has side edges 45 and 47. Metal sheet 43 is rolled so that edges 45, 47 overlap and contact one another. When overlapped, edge 47 locates within the interior side portion of adjacent edge 45, as shown in FIG. 3. Slots 35 and 37 may be cut prior to rolling metal sheet 43 to form header 21 or after header 21 is formed. Once overlapped, the cuts in side edges 45, 47 form slot 37. Slot 37 is preferably located on the outside of metal sheet 43, while slots 35 are on the inside of metal sheet 43. Referring again to FIG. 3, centerpoint 62 of slot 37 is thus 180 degrees from centerpoint 64 of slots 35.

Figure 5:
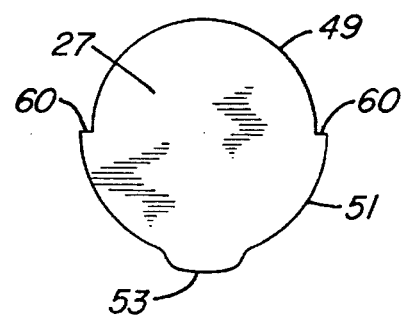
FIG. 5 is a top view of a baffle plate for use with the condenser of FIG. 1.

Referring to FIG. 5, a top view is shown of baffle plate 27. Baffle 27 is a metal member formed in the shape of a solid, flat disc having a circumferentially extending periphery which includes smaller circumference periphery 49, larger circumference periphery 51, and end tip periphery 53 which extends from larger circumference, circular periphery 51. Two notches 60 form the junctions between smaller circumference periphery 49 and larger circumference periphery 51. Notches 60 are 180 degrees apart on baffle plate 27.

Referring to FIGS. 3 and 5, smaller circumference periphery 49 is sized for mating against interior surface 55 of one of headers 21, and has a radius which is substantially equal to the inner radius of header 21. Larger circumference periphery 51 is sized for fitting flush with exterior surface 57 of header 21, and has a radius which is substantially equal to the outer radius of header 21. End tip periphery 53 extends from larger circumference periphery 53 for fitting flush with a portion of exterior 59 of lap joined, opposing edges 45 and 47.

Referring to FIG. 6, an enlarged partial view of baffle plate 27 of FIG. 5 depicts end tip periphery 53. The configuration of tip periphery 53 is similar to the configuration of the peripheral edge of overlapping edges 45, 47 (shown in FIG. 3). Tip periphery 53 has an outer portion 53a that is of larger radius than larger circumferential periphery Periphery 53 has a first edge 53b that joins outer portion and larger circumference periphery 51. Periphery 53 has a second edge 53b that is on the opposite side of tip periphery 53 and joins outer portion 53a with the larger circumference periphery Edges 53b and 53c are not parallel to each other, rather edge 53c provides a portion of periphery 53 which extends in a curved line and edge 53b extends across the side periphery of edge 45 (shown in FIG. 3). Edge 53c curves to match the periphery of bend, or joggle 46. The edges 53b and 53c converge toward each other in an outward direction and edge 53b provides a portion of periphery 53 which extends symmetrical with edge 53c. Edge 53b and edge 53c are symmetrical so that baffle 27 may be flipped over when inserted into slot 37 (shown in FIG. 2), and still match edge 45 and joggle 46.

Referring to FIGS. 1 through 4, condenser 19 is assembled to form a condenser assembly after each of headers 21 are formed from metal sheet 43, which is shown in FIG. 4. Slots 35 and 37 are cut into metal sheet 43, either before or after forming headers 21, and metal sheet 43 formed into the configuration shown in FIG. 3. Flow tubes 25 are inserted into slots 35 in headers 21 in the particular parallel arrangement shown in FIG. 1, with headers 21 extending in parallel.

Baffles 27 are inserted into header 21 by passing through aperture 37 and into the configuration shown in FIG. 2, in which smaller circumference periphery 49 mates flush with interior surface 55, larger circumference periphery 51 mates flush with exterior surface 57, and end tip periphery 53 fits substantially flush with exterior 59. Notches 60 abut ends 38 of slots 37 when baffle plate 27 is inserted into slot 37. End caps 41 and fittings for inlet 31 and outlet 33 are secured into headers 21.

The entire condenser assembly is then placed in a brazing furnace to braze end caps 41, flow tubes 25, baffles 27, and lap joined ends 45 and 47 so that parallel flow condenser 19 has a fluid-tight seal. Headers 21, end caps 41, flow tubes 25, and baffles 27 are formed from an aluminum alloy which is coated with a brazing material for joining these components together in the brazing furnace. Headers 21, end caps 41, and baffles 27 are each formed from aluminum alloy brazing sheet having a thickness which substantially measures 75 thousandths of an inch (0.075 inches).

The present invention offers several advantages over the prior art. One advantage is that a condenser according to the present invention has headers formed from metal sheets which have edges that are lap joined, which is easier to assemble than the butt joined edges of prior art condensers. Another advantage is that the condenser headers of the present invention may be fabricated using less expensive equipment than can be used for fabricating the butt joined condenser headers of the prior art.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. A method for producing a parallel flow heat exchanger, the method comprising the steps of:

providing metal sheets, inlet and outlet fittings, flow tubes, fins, and end caps;

rolling the metal sheets into a tubular shape to lap the two opposing edges of each of the metal sheets to provide tubular headers;

forming first apertures into the metal sheets between two opposing edges of each of the metal sheets for receiving the flow tubes in a parallel arrangement longitudinally along one side of the tubular shape;

forming a second aperture through the two opposing edges of one of the tubular headers, the second aperture arranged in an alignment for directing the fluid to flow into particular ones of the first apertures for providing a parallel pattern of fluid flow between the tubular headers;

forming at least one baffle from one of the metal sheets into a shape of a flat disc having a circumferentially extending periphery which includes a smaller circumference for mating against an interior surface of the one of the tubular headers, a larger circumference for fitting flush with an exterior surface of the one of the tubular headers, and an end tip for fitting substantially flush with an exterior of the two opposing edges which are lap joined;

inserting the flow tubes into the first apertures, aligning the flow tubes to extend in the parallel arrangement between the headers, and aligning the headers in parallel;

placing fins about the flow tubes;

inserting end caps into the longitudinal ends of the tubular headers;

installing inlet and outlet fittings into the headers;

inserting the at least one baffle into the second aperture by passing the at least one baffle through the opposing edges of the one of the tubular headers, mating the periphery at the smaller circumference for the at least one baffle against the interior surface of the one of the tubular headers, fitting periphery at the larger circumference for the at least one baffle flush with the exterior surface of one of the tubular headers, and fitting the periphery at the end tip for the at least one baffle substantially flush with the exterior of the two opposing edges which are lap joined; and placing the condenser, after assembly, into a brazing furnace to sealingly secure the condenser together.

2. The method of claim 1, further comprising the step of:

forming a joggle into the metal sheet for overlapping the two opposing edges with one of the two opposing edges interiorly located adjacent to the joggle to provide a smooth internal circumference for each of the tubular headers.

3. The method of claim 2, further comprising the step of:

forming the end tip periphery with a first edge and a second edge which outwardly converge into a outer portion for fitting substantially flush with the exterior of the two opposing edges which are lap joined;

forming the first edge of the end tip periphery to extend in a curved line for fitting flush with the joggle;

forming the second edge of the end tip periphery to extend symmetrical to the first edge for fitting across an other of the two opposing edges which extends exteriorly about the one of the two opposing edges which is interiorly located adjacent to the joggle; and forming the outer portion to extend between the first and second edges for fitting flush with the portion of the other of the two opposing edges which extends between the joggle and the other of the two opposing edges.

4. The method of claim 1, further comprising the step of:

forming two notches into opposing sides of the at least one baffle for providing junctions between the smaller circumference and the larger circumference and for abutting opposite edges of the second aperture.

5. The method of clam 1, further comprising the step of:

forming the second aperture with a centerpoint which is disposed 180 degrees apart in centerpoint for the second apertures in the at least one of the two tubular headers.

6. The method of claim 1, further comprising the step of:

forming the two tubular headers, the baffles, and the end caps aluminum alloy sheets having a thickness which substantially measures 75 thousandths of an inch.

7. The method of claim 1, further comprising the steps of:

forming the end tip periphery with a first edge and a second edge which outwardly converge into a outer portion for fitting substantially flush with the exterior of the two opposing edges which are lap joined;

forming the first edge of the end tip periphery to extend in a curved line for fitting flush with the joggle;

forming the second edge of the end tip periphery to extend symmetrical to the first edge for fitting across an other of the two opposing edges which extends exteriorly about the one of the two opposing edges which is interiorly located adjacent to the joggle;

forming the outer portion to extend between the first and second edges for fitting flush with the portion of the other of the two opposing edges which extends between the joggle and the other of the two opposing edges; and forming two notches into opposing sides of the at least one baffle for providing junctions between the smaller circumference and the larger circumference, and for abutting opposite edges of the second aperture.

8. A method for producing a parallel flow heat exchanger, the method comprising the steps of:

providing metal sheets, inlet and outlet fittings, flat flow tubes, fins, and end caps;

forming a joggle into one edge of the metal sheets for overlapping an opposing edge, wherein the opposing edge will interiorly locate adjacent to the joggle to provide a smooth internal circumference;

rolling the metal sheets into a tubular shape to lap the one edge and the opposing edge, with the opposing edge interiorly located adjacent to the joggle to provide tubular headers having the smooth internal circumference;

forming first apertures into the metal sheets between one edge and the opposing edge of each of the metal sheets for receiving the flat flow tubes in a parallel arrangement longitudinally along one side of the tubular shape;

forming a second aperture through the one edge and the opposing edge of one of the tubular headers, the second aperture arranged in an alignment for directing the fluid to flow into particular ones of the first apertures for providing a parallel pattern of fluid flow between the tubular headers;

forming at least one baffle from one of the metal sheets into a shape of a flat disc having a circumferentially extending periphery which includes a smaller circumference for mating against an interior surface of the one of the tubular headers, and a larger circumference for fitting flush with an exterior surface of the one of the tubular headers;

inserting the flat flow tubes into the first apertures, aligning the flat flow tubes to extend in the parallel arrangement between the headers, and aligning the headers in parallel;

placing fins about the flat flow tubes;

placing the end caps at longitudinal ends of the tubular headers;

installing inlet and outlet fittings into the headers;

inserting the at least one baffle into the second aperture by passing the at least one baffle through one edge and the opposing edge of the one of the tubular headers, mating the periphery at the smaller circumference for the at least one baffle against the interior surface of the one of the tubular headers, and fitting periphery at the larger circumference for the at least one baffle flush with the exterior surface of one of the tubular headers; and placing the condenser, after assembly, into a brazing furnace to sealingly secure the condenser together.

9. The method of claim 8, further comprising the steps of:

providing the at least one baffle with an end tip for fitting substantially flush with an exterior of one edge which is lap joined with the opposing edge; and fitting the periphery at the end tip for the at least one baffle substantially flush with the exterior of the one edge which is lap joined with the opposing edge.

10. The method of claim 9, further comprising the step of:

forming the end tip periphery with a first edge and a second edge which outwardly converge into an outer portion for fitting substantially flush with the exterior of the one edge which is lap joined with the opposing edge;

forming the first edge of the end tip periphery to extend in a curved line for fitting substantially flush with the joggle;

forming the second edge of the end tip periphery to extend symmetrical to the first edge for fitting across and substantially flush with the one edge which extends exteriorly about the opposing edge; and forming the outer portion to extend between the first and second edges for fitting substantially flush with the portion of the other of the two opposing edges which extends between the joggle and the other of the two opposing edges.

11. The method of claim 8, further comprising the step of:

forming two notches into opposing sides of the at least one baffle for providing junctions between the smaller circumference and the larger circumference, and for abutting opposite edges of the second aperture.

12. The method of clam 8, further comprising the step of:

forming the second aperture with a centerpoint which is disposed 180 degrees apart in centerpoint for the second apertures in the at least one of the two tubular headers.

13. The method of claim 8, further comprising the step of:

forming the two tubular headers, the baffles, and the end caps from aluminum alloy sheets having a thickness which substantially measures 75 thousandths of an inch.

14. A method for producing a parallel flow heat exchanger, the method comprising the steps of:

providing metal sheets, inlet and outlet fittings, flat flow tubes, fins, and end caps;

forming a joggle into one edge of the metal sheets for overlapping an opposing edge, wherein the opposing edge will interiorly locate adjacent to the joggle to provide a smooth interior surface;

rolling the metal sheets into a tubular shape to lap the one edge and the opposing edge, with the opposing edge interiorly located adjacent to the joggle to provide tubular headers having the smooth interior surface;

forming first apertures into the metal sheets between one edge and the opposing edge of each of the metal sheets for receiving the flat flow tubes in a parallel arrangement longitudinally along one side of the tubular shape;

forming a second aperture through the one edge and the opposing edge of one of the tubular headers, the second aperture arranged in an alignment for directing the fluid to flow into particular ones of the first apertures for providing a parallel pattern of fluid flow between the tubular headers;

forming at least one baffle from one of the metal sheets into a flat shape having a smaller periphery for mating against an interior surface of the one of the tubular headers, a larger periphery for fitting flush with an exterior surface of the one of the tubular headers, and an end tip periphery for fitting substantially flush with an exterior of the one edge which is lap joined with the opposing edge;

inserting the flat flow tubes into the first apertures, aligning the flat flow tubes to extend in the parallel arrangement between the headers, and aligning the headers in parallel;

placing fins about the flat flow tubes;

placing the end caps at longitudinal ends of the tubular headers;

installing inlet and outlet fittings into the headers;

inserting the at least one baffle into the second aperture by passing the at least one baffle through one edge and the opposing edge of the one of the tubular headers, mating the smaller periphery of the at least one baffle against the interior surface of the one of the tubular headers, fitting the larger periphery of the at least one baffle flush with the exterior surface of one of the tubular headers, and fitting the end tip periphery for the at least one baffle substantially flush with the exterior of the one edge which is lap joined with the opposing edge; and placing the condenser, after assembly, into a brazing furnace to sealingly secure the condenser together.

15. The method of claim 14, further comprising the step of:

forming the end tip periphery with a first edge and a second edge which outwardly converge into a outer portion for fitting substantially flush with the exterior of the one edge which is lap joined with the opposing edge;

forming the first edge of the end tip periphery to extend in a curved line for fitting substantially flush with the joggle;

forming the second edge of the end tip periphery to extend symmetrical to the first edge for fitting across and substantially flush with the one edge which extends exteriorly about the opposing edge; and forming the outer portion to extend between the first and second edges for fitting substantially flush with the portion of the other of the two opposing edges which extends between the joggle and the other of the two opposing edges.

16. The method of claim 14, further comprising the step of:

forming two notches into opposing sides of the at least one baffle for providing junctions between the smaller periphery and the larger periphery, and for abutting opposite edges of the second aperture.

17. The method of clam 14, further comprising the step of:

forming the second aperture with a centerpoint which is disposed 180 degrees apart in centerpoint for the second apertures in the at least one of the two tubular headers.

18. The method of claim 14, further comprising the step of:

forming the two tubular headers, the baffles, and the end caps from aluminum alloy sheets having a thickness which substantially measures 75 thousandths of an inch.

19. The method according of claim 14, further comprising the steps of:

forming two notches into opposing sides of the at least one baffle for providing junctions between the smaller periphery and the larger periphery, and for abutting opposite edges of the second aperture; and forming the second aperture with a centerpoint which is disposed 180 degrees apart in centerpoint for the second apertures in the at least one of the two tubular headers.

20. The method of claim 14, further comprising the steps of:

forming the end tip periphery with a first edge and a second edge which outwardly converge into a outer portion for fitting substantially flush with the exterior of the one edge which is lap joined with the opposing edge;

forming the first edge of the end tip periphery to extend in a curved line for fitting substantially flush with the joggle;

forming the second edge of the end tip periphery to extend symmetrical to the first edge for fitting across and substantially flush with the one edge which extends exteriorly about the opposing edge;

forming the outer portion to extend between the first and second edges for fitting substantially flush with the portion of the other of the two opposing edges which extends between the joggle and the other of the two opposing edges; and forming two notches into opposing sides of the at least one baffle for providing junctions between the smaller periphery and the larger periphery, and for abutting opposite edges of the second aperture.

* * * * *